United States Patent [19]

Shigyo et al.

[11] Patent Number: 5,015,854
[45] Date of Patent: May 14, 1991

[54] RADIATION IMAGE DISPLAYING APPARATUS

[75] Inventors: Masao Shigyo; Shoji Kanada; Eiji Oshida, all of Kanagawa, Japan

[73] Assignee: Fuji Photo Film Co., Ltd., Kanagawa, Japan

[21] Appl. No.: 320,425

[22] Filed: Mar. 8, 1989

[30] Foreign Application Priority Data

Mar. 14, 1988 [JP] Japan ................................ 63-59618

[51] Int. Cl.⁵ .............................................. G01T 1/105
[52] U.S. Cl. ................................ 250/327.2; 250/484.1
[58] Field of Search ................ 250/327.2 A, 327.2 R, 250/327.2 D, 484.1 B; 382/47; 364/413.13

[56] References Cited

U.S. PATENT DOCUMENTS

| 4,603,254 | 7/1986 | Takano et al. | 364/413.13 |
| 4,691,238 | 9/1987 | Yamada | 382/47 |
| 4,764,975 | 8/1988 | Inoue | 382/47 |

OTHER PUBLICATIONS

Tateno et al., "Computed Radiography", Springer Verlag (1987) p. 41.

Primary Examiner—Janice A. Howell
Assistant Examiner—Richard Hanig
Attorney, Agent, or Firm—Sughrue, Mion, Zinn, Macpeak & Seas

[57] ABSTRACT

A radiation image displaying apparatus comprises an interface connected to an image signal gathering apparatus, which obtains an image signal by reading out a radiation image, and to an image signal storage device, which stores the image signal, an image processor for image-processing the image signal, a storage section for storing the image signal, and an image displaying section for reproducing and displaying a radiation by use of the image signal. An image signal extracting section processes the image signal in order to decrease the number of picture elements in the radiation image, which are represented by the image signal, thereby generating a condensed image signal which represents an outline of the radiation image. The storage section stores both the image signal, which is received from the image signal gathering apparatus or from the image storage device, and the condensed image signal generated by the image signal extracting section from the image signal.

5 Claims, 4 Drawing Sheets

F I G.1
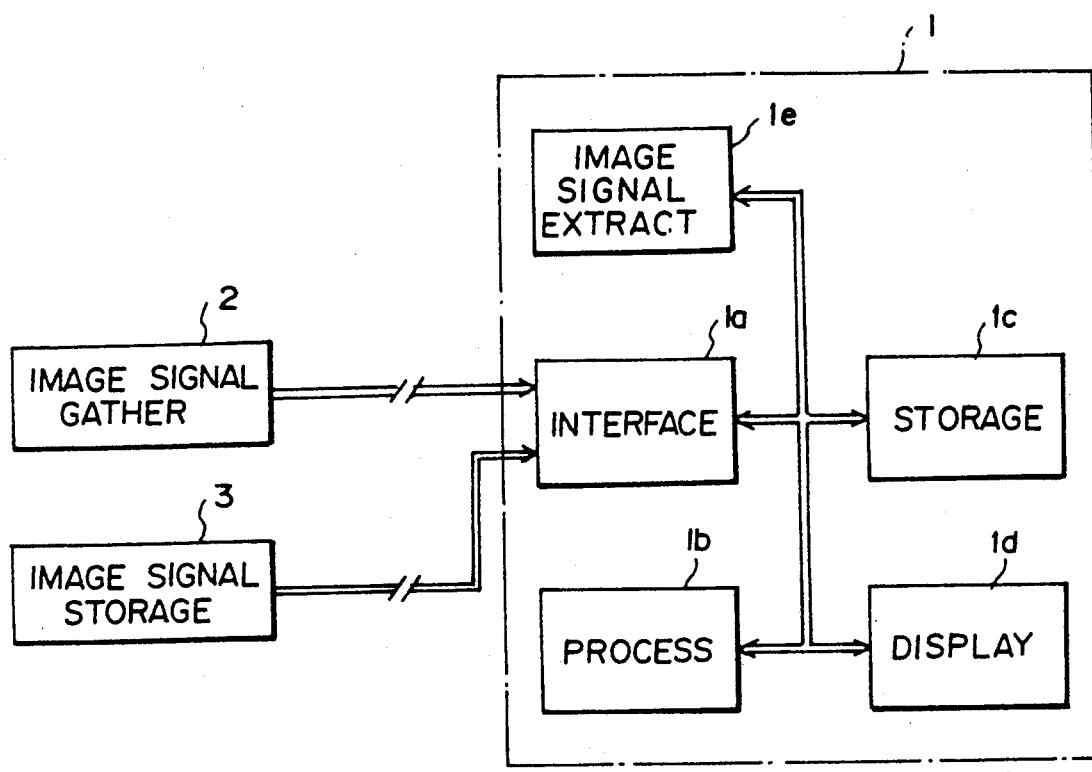

RADIATION IMAGE DISPLAYING APPARATUS

BACKGROUND OF THE INVENTION

1. Field of the Invention

This invention relates to a radiation image displaying apparatus for receiving an image signal which is obtained by reading out a radiation image and which is entered into the displaying apparatus from an external apparatus, and reproducing and displaying a radiation image by use of the image signal.

2. Description of the Prior Art

Techniques for reading out a recorded radiation image to obtain an image signal, carrying out appropriate image processing of the image signal, and then reproducing a visible image by use of the processed image signal have heretofore been known in various fields. For example, there has been proposed a system wherein an X-ray image is recorded on an X-ray film having a gamma value selected for the type of image processing to be carried out on an image signal obtained when the X-ray image is read out from the X-ray film and converted into an electric signal, and wherein the electric signal (image signal), which has been image-processed, is then used for reproducing the X-ray image as a visible image on a copy photograph or the like. In this manner, a visible image having good image quality, and exhibiting such characteristics as high contrast, high sharpness or high graininess can be reproduced.

Also, when certain kinds of phosphors are exposed to radiation such as X-rays, α-rays, β-rays, γ-rays, cathode rays or ultraviolet rays, they store part of the energy of the radiation. Then, when the phosphor which has been exposed to the radiation is exposed to stimulating rays such as visible light, light is emitted by the phosphor in proportion to the amount of energy stored during exposure to the radiation. A phosphor exhibiting such properties is referred to as a stimulable phosphor. As disclosed in U.S. Pat. Nos. 4,258,264, 4,276,473, 4,315,318 and 4,387,428 and Japanese Unexamined Patent Publication No. 56(1981)-11395, it has been proposed to use stimulable phosphors in radiation image recording and reproducing systems. Specifically, a sheet provided with a layer of the stimulable phosphor (hereinafter referred to as a stimulable phosphor sheet) is first exposed to radiation which has passed through an object such as the human body in order to store a radiation image of the object thereon, and is then scanned with stimulating rays, such as a laser beam, which cause it to emit light in proportion to the amount of energy stored during exposure to the radiation. The light emitted by the stimulable phosphor sheet upon stimulation thereof is photoelectrically detected and converted into an electric image signal, and by using the image signal, a radiation image recording and reproducing system reproduces the radiation image of the object as a visible image on a recording material such as a photographic film, a display device such as a cathode ray tube (CRT), or the like.

A radiation image recording and reproducing system using a stimulable phosphor sheet is advantageous over conventional radiography using silver halide in that the amount of light emitted by the stimulable phosphor sheet is proportional to the energy intensity of the radiation to which the stimulable phosphor sheet is exposed when an image is recorded, and the energy intensity of said radiation may be selected from a very wide range (latitude) of radiation energy intensities. If an appropriate read-out gain is selected and used when the light emitted by said stimulable phosphor sheet is detected, a desirable density can be obtained in the finally reproduced visible image regardless of the energy intensity of the radiation to which the stimulable phosphor sheet was exposed.

The aforesaid radiation image recording and reproducing system is often required to process a large number of radiation images. By way of example, a radiation image recording and reproducing system on such a large scale is constituted of an image signal gathering apparatus for obtaining an image signal by reading out a radiation image, and a radiation image displaying apparatus which is provided with a storage device adapted for quick access, such as a magnetic disk device, and which stores an image signal received from the image signal gathering apparatus, carries out image processing on the image signal, and reproduces and displays a radiation image from the processed image signal. Also, an image signal storage device is provided for storing a large number of image signals for a long period of time.

In the aforesaid large-scale radiation image recording and reproducing system, an image signal obtained by the image signal gathering apparatus is transferred to the radiation image displaying apparatus. In cases where an image signal should be used either immediately or soon, it is stored in the radiation image displaying apparatus in the storage device adapted for quick access, such as a magnetic disk device. On the other hand, in cases where the image signal need not be used immediately or soon, it is transferred from the radiation image displaying apparatus to the image signal storage device and stored on a storage medium, which has an access time longer than that of a magnetic disk but which can store a large number of image signals, such as an optical disk. An image signal stored in the image signal storage device can then be transferred back to the radiation image displaying apparatus and used when a radiation image is reproduced and displayed.

An image signal which has been transferred from the image signal gathering apparatus or from the image signal storage device into the radiation image displaying apparatus is stored in the storage device, such as a magnetic disk device, provided in the radiation image displaying apparatus. Thereafter, the image signal is read from the storage device and subjected to appropriate image processing when necessary, and a radiation image is reproduced and displayed by use of the processed image signal.

In cases where only a small number of image signals representing radiation images of, for example, a single object are transferred to the radiation image displaying apparatus, radiation images can be reproduced and displayed sequentially if the name of an object is used as a key word to access the image signals stored in the storage device. In this case, a desired radiation image can be quickly identified in a group of sequentially displayed radiation images. However, in cases where a large number of image signals representing radiation images of, for example, a single object are transferred to the radiation image displaying apparatus and a large number of radiation images are reproduced and displayed sequentially, a long time is required to identify a desired radiation image from among the large number of radiation images displayed sequentially.

SUMMARY OF THE INVENTION

The primary object of the present invention is to provide a radiation image displaying apparatus wherein a desired image signal is found quickly from among a large number of image signals which are stored in a storage device of the radiation image displaying apparatus.

Another object of the present invention is to provide a radiation image displaying apparatus which displays a large number of radiation images simultaneously on a single display device in order to facilitate finding a desired image signal from among a large number of image signals which are stored in a storage device of the radiation image displaying apparatus.

FIG. 1 is a schematic view showing the general configuration of the radiation image displaying apparatus in accordance with the present invention, to which an image signal gathering apparatus and an image signal storage device are connected.

A radiation image displaying apparatus 1 in accordance with the present invention is provided with an interface section 1a to which an image signal gathering apparatus 2, which obtains an image signal by reading out a radiation image, and an image signal storage device 3, which stores the image signal, are connected. The radiation image displaying apparatus 1 is constituted of the interface section 1a, an image processing section 1b for carrying out image processing on an image signal entered thereinto through the interface section 1a, a storage section 1c for storing the image signal, and an image displaying section 1d for reproducing and displaying a radiation image by use of the image signal. The sections 1a, 1b, 1c and 1d are connected so that the image signal can be transferred among them.

The radiation image displaying apparatus 1 is also provided with an image signal extracting section 1e, which upon receiving an image signal from the image signal gathering apparatus 2 or from the image signal storage device 3, processes the image signal in order to decrease the number of radiation image picture elements which the image signal represents, thereby generating a condensed image signal which represents an outline of said radiation image. The storage section 1c stores both image signals received from the image signal gathering apparatus 2 and from the image signal storage device 3 as well as condensed image signals generated by the image signal extracting section 1e.

As described above, in cases where a large number of radiation images are reproduced and displayed, for example, sequentially by use of a large number of image signals entered into the radiation image displaying apparatus, a long time is needed to find a desired radiation image from among the large number of radiation images.

With the radiation image displaying apparatus in accordance with the present invention, both an image signal and its corresponding condensed image signal are stored in the storage section. Therefore, a large number of radiation image outlines, represented by a large number of condensed image signals stored in the storage section, can be displayed simultaneously on a single display device, for example, on a single CRT display device. Accordingly, a desired image signal can be found quickly from among a large number of image signals. After the desired image signal is found, the radiation image, which the desired image signal represents, is reproduced and displayed over the whole image plane of the display device, so that the details of the radiation image can be viewed.

BRIEF DESCRIPTION OF THE DRAWINGS

FIG. 1 is a schematic view showing the general configuration of the radiation image displaying apparatus in accordance with the present invention, to which an image signal gathering apparatus and an image signal storage device are connected.

DESCRIPTION OF THE PREFERRED EMBODIMENTS

The present invention will hereinbelow be described in further detail with reference to the accompanying drawings.

Figure 2:
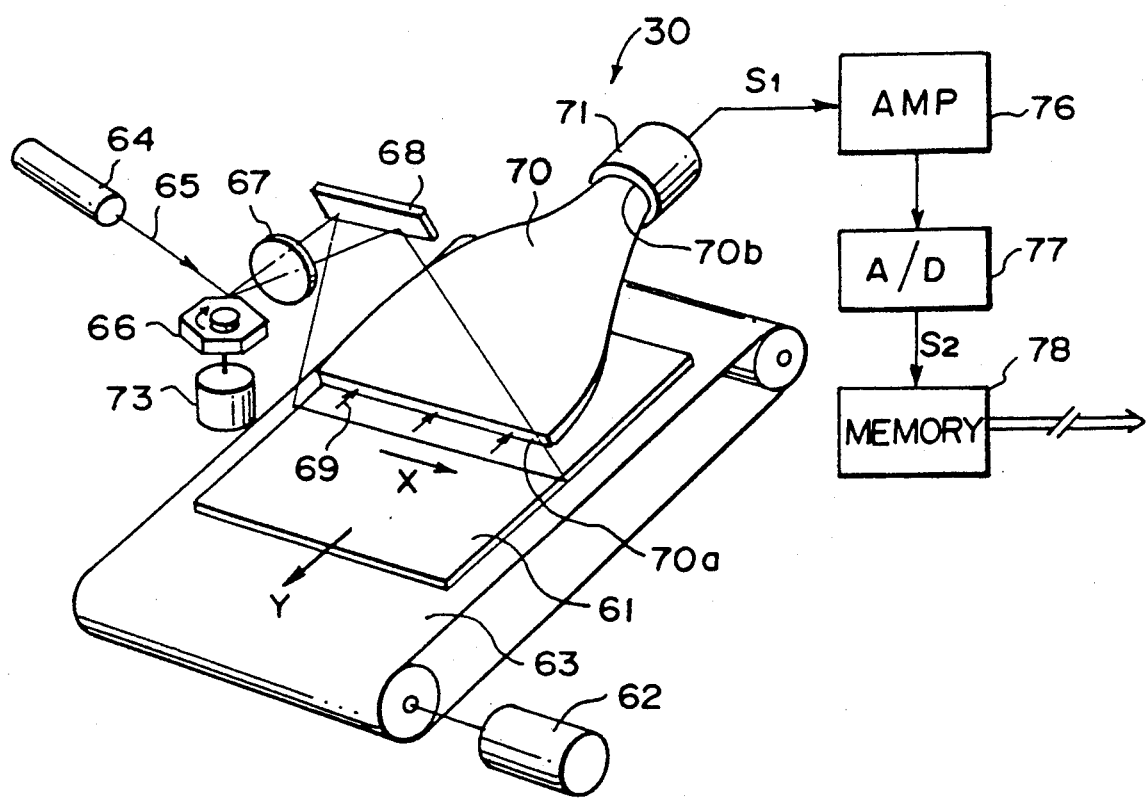
FIG. 2 is a perspective view showing an example of the image signal gathering apparatus.

With reference to FIG. 2, an image signal gathering apparatus connected to the radiation image displaying apparatus in accordance with the present invention utilizes a stimulable phosphor sheet. As described above, when the stimulable phosphor, which constitutes a layer of the stimulable phosphor sheet, is exposed to radiation, it stores part of the energy of the radiation. Then, when the stimulable phosphor which has been exposed to the radiation is exposed to stimulating rays such as visible light, light is emitted by the stimulable phosphor in proportion to the amount of energy stored during exposure to the radiation.

In an image recording apparatus (not shown), the stimulable phosphor sheet is exposed to radiation which has passed through an object such as the human body, and a radiation image of the object is stored on the stimulable phosphor sheet.

A stimulable phosphor sheet 61 on which a radiation image has been stored in the manner described above is placed at a predetermined position in an image signal gathering section 30 shown in FIG. 2.

The stimulable phosphor sheet 61 placed in the image signal gathering apparatus 30 is conveyed in a subscanning direction indicated by the arrow Y by a sheet conveyance means 63 constituted of an endless belt or the like operated by a motor 62. On the other hand, stimulating rays 65 produced by a laser beam source 64 are reflected and deflected by a rotating polygon mirror 66, which is quickly rotated by a motor 73 in the direction indicated by the arrow, and the stimulating rays 65 pass through a converging lens 67 constituted of an fθ lens or the like. The direction of the optical path of the stimulating rays 65 is then changed by a mirror 68, and the stimulating rays 65 impinge upon the stimulable phosphor sheet 61 and scan across it in a main scanning direction indicated by the arrow X, which main scanning direction is approximately normal to the subscanning direction indicated by the arrow Y. When the stimulable phosphor sheet 61 is exposed to the stimulating rays 65, the exposed portion of the stimulable phosphor sheet 61 emits light 69 with an intensity proportional to the amount of energy stored during exposure to radiation. The emitted light 69 is guided by a light guide member 70, and photoelectrically detected by a photomultiplier 71 which acts as a photodetector. The light guide member 70 is made from a light guiding material such as an acrylic plate, and has a linear light input face 70a positioned so that it extends along the main scanning line on the stimulable phosphor sheet 61, and a ring-shaped light output face 70b is positioned in close contact with a light receiving face of the photomultiplier 71. The emitted light 69 entering the light guide member 70 through its light input face 70a is guided through repeated total reflection inside of the light guide member 70, emanates from the light output face 70b, and is received by the photomultiplier 71. In this manner, the intensity of the emitted light 69, which carries the information about the radiation image, is detected by the photomultiplier 71. An analog signal S1 generated by the photomultiplier 71 is amplified by an amplifier 76. The analog signal S1 after being amplified is sampled by an A/D converter 77 at predetermined intervals, and the analog signal thus sampled is digitized. The digital image signal S2 thus obtained is stored in a memory 78. After the image signal S2 detected from the whole surface of a single stimulable phosphor sheet 61 is stored in the memory 78, the image signal S2 is sent from the memory 78 to a radiation image displaying apparatus 10 which will be described later. Image read out from the next stimulable phosphor sheet is begun only after the signal S2 has been sent from the memory 78 to the radiation image displaying apparatus 10, and the memory 78 is readied for storing the next image signal.

Figure 3:
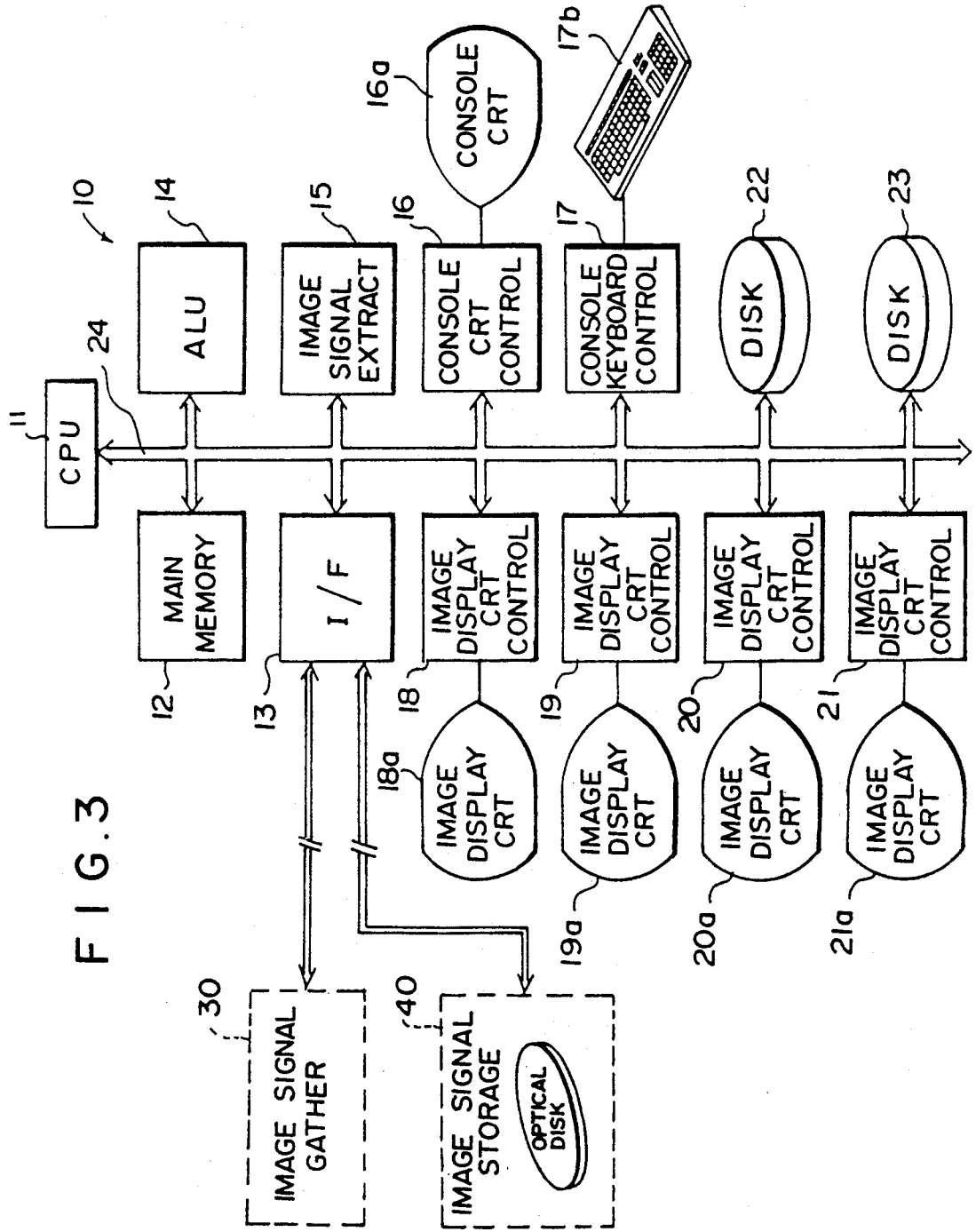
FIG. 3 is a schematic view showing an embodiment of the radiation image displaying apparatus in accordance with the present invention.

With reference to FIG. 3, the radiation image displaying apparatus 10 comprises a central processing unit (hereinafter abbreviated to CPU) 11, and a main memory 12 which may be constituted of an IC memory or the like for storing programs and various flags needed for the operation of the displaying apparatus 10. An interface 13 is connected to the image signal gathering apparatus 30 shown in FIG. 2 and to an image signal storage device 40 which may be constituted of a magnetic tape device o the like. An image processing unit (hereinafter abbreviated to ALU) 14 carries out appropriate image processing of image signals entered via the interface 13. An image signal extracting device 15 condenses the entered image signals in order to obtain condensed image signals which represent outlines of the radiation images. A control device 16 controls a console CRT display device 16a, and a control device 17 controls a console keyboard 17b. Control devices 18, 19, 20 and 21 are connected respectively to CRT display devices 18a, 19a, 20a and 21a, which display images. The radiation image displaying apparatus 10 also comprises magnetic disk devices (hereinafter abbreviated to DISK's) 22 and 23. The units (and devices) 11 through 23 are connected to one another via a bus line 24.

The interface 13 corresponds approximately to the interface section 1a shown in FIG. 1. The ALU 14 corresponds approximately to the image processing section 1b shown in FIG. 1. The DISK 22 corresponds approximately to the storage section 1c shown in FIG. 1. The control devices 18, 19, 20 and 21, and the CRT display devices 18a, 19a, 20a and 21a correspond approximately to the image displaying section 1d shown in FIG. 1. The image signal extracting device 15 corresponds approximately to the image signal extracting section 1e shown in FIG. 1.

The CPU 11 controls the units (and devices) 13 through 23 in accordance with programs stored in the main memory 12. The control devices 16 and 17, the console CRT display device 16a, and the console keyboard 17b are used to confirm that the operating conditions of the radiation image displaying apparatus 10 are correct and to provide operating instructions thereto. Also, the DISK 23 stores the programs which are transferred for execution to the main memory 12. Therefore, the CPU 11, the main memory 12, the control device 16 and the console CRT display device 16a, the control device 17 and the console keyboard 17b, and the DISK 23 correspond to the sections 1a, 1b, 1c, 1d and 1e shown in FIG. 1.

An image signal entered from the image signal gathering apparatus 30 or from the image signal storage device 40 into the radiation image displaying apparatus 10 via the interface 13 is stored in the DISK 22 and entered into the image signal extracting device 15.

Figure 4:
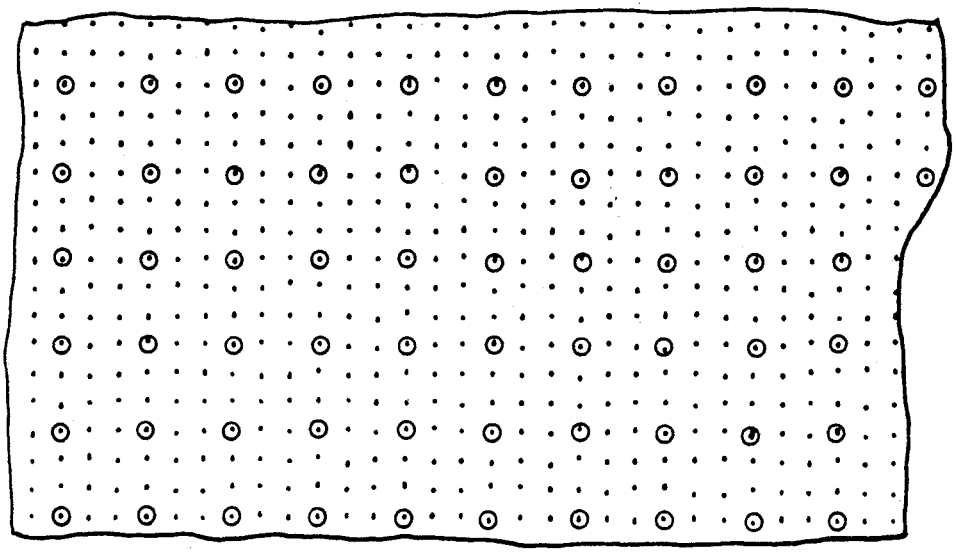
FIG. 4 is a schematic view showing the center points of picture elements on part of the stimulable phosphor sheet shown in FIG. 2.

FIG. 4 illustrates the type of processing carried out by the image signal extracting device 15 to decrease the number of picture elements in a radiation image. Part of the stimulable phosphor sheet 61 shown in FIG. 2 is shown in FIG. 4.

With reference to FIG. 4, the image signal S2 which has been sampled and digitized by the A/D converter shown in FIG. 2 carries information about specific positions on the stimulable phosphor sheet 61, and the dots indicate the centers of those positions, i.e. the centers of the picture elements. The image signal S2 was generated by sampling and digitizing the analog signal obtained by detecting the light emitted when the surface of the stimulable phosphor sheet was scanned.

The components of the image signal S2 which correspond to the positions indicated by the dots are entered into the image signal extracting device 15. As indicated at the circles in FIG. 4, the image signal extracting device 15 samples the signal components at every third row and every third column in the array of picture elements. The condensed image signal which is composed of the signal components thus sampled represents an outline of the radiation image.

The condensed image signal which is generated by the image signal extracting device 15 and which is composed of the signal components indicated at the circles shown in FIG. 4 is transferred to the DISK 22, and is stored therein together with the image signal which is entered from the interface 13 and which is composed of all the signal components of the digital signal S2, as indicated at the dots in FIG. 4.

The condensed image signal stored in the DISK 22 is used when a desired image signal is to be found from among a large number of image signals.

Figure 5:
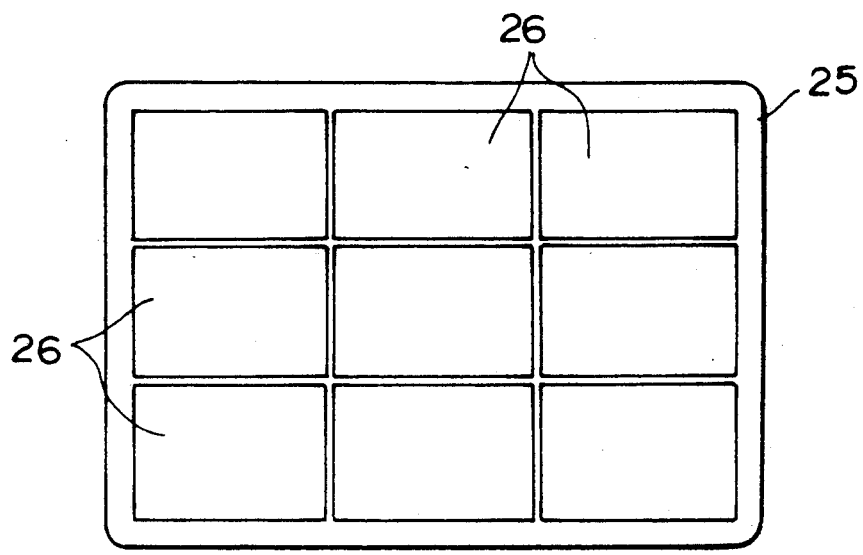
FIG. 5 is a schematic view showing an example of the state of the radiation image displaying apparatus in which a plurality of radiation images are displayed, said plurality of radiation images being represented by condensed image signals.

FIG. 5 shows the state of one of the CRT display devices 18a, 19a, 20a and 21a shown in FIG. 3 when reproducing and displaying images by use of condensed image signals.

Among a large number of images which are represented by a large number of condensed image signals read from the DISK 22 when, for example, a key word such as the name of the object is used to access the large number of condensed image signals stored in the DISK 22, nine images 26, 26, ... are displayed simultaneously on a single image plane 25. In cases where radiation images are displayed by using the original image signals, only a single radiation image can generally be displayed on a single image plane, and therefore only four radiation images can be displayed when the CRT display devices 18a, 19a, 20a and 21a shown in FIG. 3 are used simultaneously. On the other hand, in cases where the nine images 26, 26, . . . are displayed on a single image plane 25, 36 images (i.e. 9 multiplied by 4) can be displayed simultaneously on the CRT display devices 18a, 19a, 20a and 21a. Therefore, a desired image can be found quickly.

Only the original image signals may be stored in the DISK 22, and the condensed image signals may be obtained by transferring the original image signals into the ALU 14 just before the images are reproduced and displayed. By using the condensed image signals, the images may then be displayed on the CRT display devices 18a, 19a, 20a and 21a, for example, as shown in FIG. 5. In this case, the condensed image signals are generated after an instruction is entered to display the images in the mode shown in FIG. 5. Therefore, after entering such as instruction, the operator of the radiation image displaying apparatus must wait for a long time before the images are displayed as shown in FIG. 5. Accordingly, a long time is taken to find a desired image.

With the radiation image displaying apparatus in accordance with the present invention, condensed image signals are generated and stored in the DISK 22 approximately at the same time the original image signals are stored in the DISK 22. Therefore, a desired image can be found quickly.

In order to obtain a condensed image signal quickly, the image signal extracting device 15 should preferably be constituted so a to obtain the condensed image signal with a hardware means, However, in cases where a slight time delay is allowable. The image signal extracting device 15 may be constituted so as to obtain the condensed image signal with a software means. Also, the method of obtaining the condensed image signal is not limited to the one wherein signal components are sampled at every third row and every third column of the picture element array as shown in FIG. 4. The picture element array may be sampled according to other predetermined patterns. Alternatively, for each group of several picture elements, the mean value of the values of the signal components in the group of several picture elements may be calculated. A condensed image signal may be formed from the mean values thus calculated.

Figure 6:
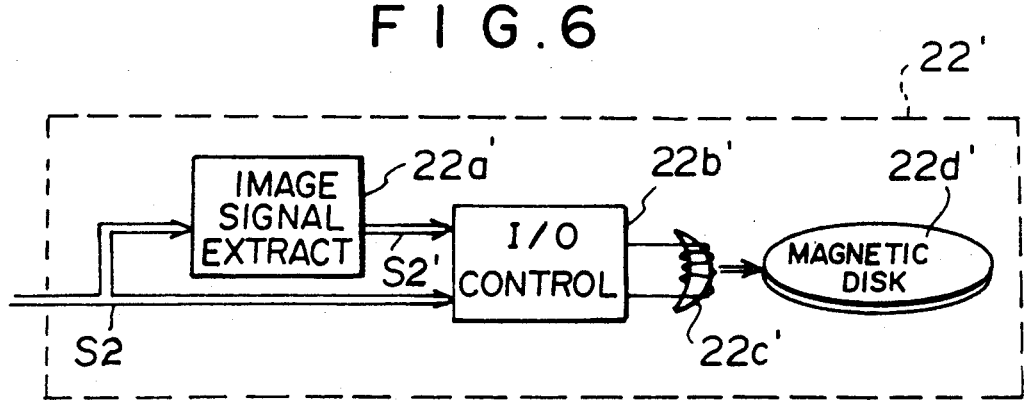
FIG. 6 is a block diagram showing an embodiment wherein an image signal extracting circuit is provided in an image signal storage device.

FIG. 6 shows an embodiment wherein an image signal extracting circuit 22a' for obtaining a condensed image signal is provided in an image signal storage device 22' which corresponds to the DISK 22 shown in FIG. 3.

With reference to FIG. 6, the image signal S2 fed to the image signal storage device 22' is entered into the image signal extracting circuit 22a' and an input/output control circuit 22b'. The image signal extracting circuit 22a' generates a condensed image signal S2' which represents an outline of the radiation image represented by the image signal S2. Both the image signal S2 and the condensed image signal S2' are entered into the input/output control circuit 22b', and are then stored on a magnetic disk 22d' by use of a magnetic head 22c'. When the stored signal is to be used, it is read from the magnetic disk 22d' with the magnetic head 22c', and sent through the input/output control circuit 22b'.

In the embodiment shown in FIG. 6, the image signal extracting circuit 22a' in the image signal storage device 22' corresponds to the image signal extracting section 1e shown in FIG. 1. The elements outside of the image signal extracting circuit 22a' in the image signal storage device 22' correspond to the storage section 1c shown in FIG. 1.

The image signal extracting section 1e shown in FIG. 1 may be embodied in various other manners.

We claim:

1. A radiation image displaying apparatus comprising:
   (i) an interface section connected to an image signal gathering apparatus, which obtains an image signal by reading out a radiation image, and to an image signal storage device, which stores at least one image signal corresponding to a radiation image,
   (ii) an image processing section for carrying out image processing of an image signal,
   (iii) a storage section for storing at least one image signal corresponding to a radiation image to be displayed, and
   (iv) an image displaying section for reproducing an displaying a radiation image corresponding to an image signal stored in said storage section,
   said interface section, said image processing section, said storage section and said image displaying section being connected to one another,
   wherein the improvement comprises:
   (a) an image signal extracting section connected to said storage section, for processing image signals for said storage section in order to decrease the number of picture elements in the radiation images which are represented by said image signals, thereby generating a condensed image signal, which represents an outline of the corresponding radiation image, for each image signal stored in said storage section such that a plurality of said radiation image outlines can be simultaneously displayed by said image displaying section, and
   (b) said storage section including means for storing both said image signals, which are received from said image signal gathering apparatus or from said image signal storage device, and the condensed image signals, which are generated by said image signal extracting section from said image signal.

2. An apparatus as defined in claim 1 wherein said image signal extracting section includes means for decreasing the number of picture elements in the radiation image by sampling an array made up of components of said image signal representing said picture elements according to a predetermined pattern.

3. An apparatus as defined in claim 1 wherein said image signal gathering apparatus reads out a radiation image stored on a stimulable phosphor sheet by two-dimensionally scanning said stimulable phosphor sheet with stimulating rays which cause said stimulable phosphor sheet to emit light in proportion to the amount of energy stored during exposure to radiation, and photoelectrically detecting the emitted light.

4. An apparatus as defined in claim 1, further including
   means for selecting displaying in said image displaying section either a plurality of said radiation image outlines or a radiation image by selectively reading from said storage section either a plurality of condensed image signals or an image signal.

5. An apparatus as defined in claim 4, further including means for selecting one of a plurality of displayed radiation images outlines and for retrieving from said storage section the image signal corresponding to the selected one of the displayed radiation image outlines for displaying said retrieved image signal.

* * * * *